United States Patent [19]

Tsuchida et al.

[11] Patent Number: 4,822,526

[45] Date of Patent: Apr. 18, 1989

[54] PROCESS FOR PREPARING LIQUID ROSIN ESTER WITH ANTHRAQUINONE AND ALKALI METAL IODIDE

[75] Inventors: Seiichi Tsuchida; Tsukasa Ishimoto, both of Sakai, Japan

[73] Assignee: Arakawa Chemical Industries, Ltd., Osaka, Japan

[21] Appl. No.: 184,448

[22] PCT Filed: Aug. 18, 1986

[86] PCT No.: PCT/JP86/00423

§ 371 Date: Mar. 23, 1988

§ 102(e) Date: Mar. 23, 1988

[51] Int. Cl.$^4$ .............................. C09F 1/04; C09F 7/00
[52] U.S. Cl. ........................................ 260/103; 260/104
[58] Field of Search ................................ 260/103, 104

[56] References Cited

U.S. PATENT DOCUMENTS

| | | | |
|---|---|---|---|
| 4,585,584 | 4/1986 | Johnson et al. | 260/104 |
| 4,657,703 | 4/1987 | Durkee | 260/104 |
| 4,657,706 | 4/1987 | Durkee | 260/104 |

*Primary Examiner*—Harold D. Anderson
*Attorney, Agent, or Firm*—Larson and Taylor

[57] ABSTRACT

Disclosed is a process for preparing a liquid rosin ester which is light-colored and highly stable, characterized in that the process comprises subjecting to thermal reaction a rosin and an alcohol in the presence of anthraquinone and at least one alkali metal iodide selected from sodium iodide and potassium iodide.

2 Claims, No Drawings

PROCESS FOR PREPARING LIQUID ROSIN ESTER WITH ANTHRAQUINONE AND ALKALI METAL IODIDE

TECHNICAL FIELD OF THE INVENTION

The present invention relates to a process for preparing a liquid rosin ester and more particularly to a process for preparing a liquid rosin ester which is light-colored and outstanding in stability.

BACKGROUND ART

Rosin esters prepared as liquid resins by esterification of rosin and monohydric or polyhydric alcohol have been heretofore recommended for use as additives, modifiers or the like for adhesives, coating compositions or the like. Especially a liquid rosin ester is used as an important constituent of a sticky adhesive because of its tackiness, namely as a liquid tackifier. Known liquid tackifiers other than the rosin ester include, for example liquid terpene resins, liquid petroleum resins, polybutenes, liquid polyisoprenes, etc. Liquid rosin esters are excellent in tackiness as compared with the above other liquid resins and process oil (process oil or the like being useful as a plasticizer) but are not invariably satisfactory in color tone and heat stability.

For the above reasons, it is desired in industries to develop new liquid resins, particularly liquid rosin esters, which are high in tackiness, light-colored, and significantly stable.

It is known that a liquid rosin ester having an improved heat stability can be produced by disproportionation or hydrogenation of rosin, followed by esterification. However, such process provides rosin esters which are colored due to the thermal degradation of rosin in the course of the reaction, and it is difficult to prevent the coloration. Further the process gives rosin esters which are short of satisfactory in the heat stability required of liquid tackifiers.

Japanese Unexamined Patent Publication No. SHO 59-230072 discloses a technique for preparing a light-colored and highly stable liquid rosin ester by subjecting to esterification reaction a rosin purified by distillation and alcohol in the presence of a specific organic sulfur compound. However, this process essentially involves two procedures, i.e. distillation and esterification procedures, and thus is low in productive efficiency and also economically disadvantageous.

In view of the present situation as stated above, the present inventors conducted extensive research to develop a novel liquid rosin ester which is fully satisfactory in any of color tone, heat stability, productive efficiency and other requirements, particularly by directing attention to a stabilizer to be added in esterification reaction. Our research revealed that when a specific alkali metal iodide and anthraquinone are used in combination, there is provided a technique for producing a liquid rosin ester which answers the foregoing purpose. The present invention has been accomplished based on this novel finding.

DISCLOSURE OF THE INVENTION

The present invention provides a process for preparing a liquid rosin ester which is light-colored and highly stable, characterized in that the process comprises subjecting to thermal reaction a rosin and an alcohol in the presence of anthraquinone and at least one alkali metal iodide selected from sodium iodide and potassium iodide.

The rosin to be used in the present invention can be any of rosins well known heretofore. Examples of useful rosins are gum rosins containing a predominant amount of resin acid such as abietic acid, palustric acid, neoabietic acid, pimaric acid, isopimaric acid, dehydroabietic acid or the like; wood rosins; tall oil rosins; etc.

Alcohols useful in the present invention can be suitably selected from monohydric alcohols and dihydric alcohols according to the softening point of rosin ester to be prepared. Specific examples of such alcohols are monohydric alchohols such as propyl alcohol, butyl alcohol, pentyl alcohol, hexyl alcohol, heptyl alcohol and like alcohols having 3 to 7 carbon atoms, octyl alcohol, 2-ethylhexyl alcohol, decyl alcohol, lauryl alcohol and the like; and dihydric alcohols such as ethylene glycol, diethylene glycol, triethylene glycol, polyethylene glycol and the like. Polyhydric alcohols such as glycerin, trimethylolpropane, pentaerythritol and the like can be used conjointly with the above monohydric or dihydric alcohols in the present invention.

It is important that the esterification reaction of the present invention be carried out in the presence of anthraquinone and at least one alkali metal iodide selected from sodium iodide and potassium iodide. This results in accomplishment of remarkable effects peculiar to the present invention. The above esterification reaction can be performed under the same conditions as those for this type of conventional esterification reactions with the exception of using the above-specified alkali metal iodide and anthraquinone. More specifically, a rosin and an alcohol are mixed in the presence of the above-specified alkali metal iodide and anthraquinone and the mixture is heated in an inert atmosphere with or without a solvent to undergo dehydration condensation. The thermal reaction conditions can be the same as those for this kind of esterification reactions heretofore known. The above esterification reaction can employ catalysts commonly used for esterification to reduce the reaction time. Suitable examples of solvents useful in the reaction are aromatic solvents such as benzene, toluene, xylene and the like. Examples of catalysts useful for esterification are sulfuric acid, acetic acid, p-toluenesulfonic acid and like acid catalysts, calcium hydroxide and like hydroxides of alkaline earth metals, magnesium oxide, calcium oxide and like metal oxides, calcium carbonate, magnesium acetate and like usual esterification catalysts, etc.

The mixing ratio of rosin and alcohol to be used in the reaction is not specifically limited and can be suitably determined according to the kind and acid value of the rosin, softening point of the resulting esterification product and other factors. Usually it is preferred that the equivalent ratio of the hydroxyl group in the alcohol to the carboxyl group in the rosin be about 0.6–1.4:1.

The amount of the alkali metal iodide to be used in the present invention may be selected from the range of about 0.01 to about 3.0% by weight (expressed hereinafter simply by %), preferably about 0.1 to about 1.0% based on the rosin. It is desirable that the amount of the anthraquinone to be used along with the alkali metal iodide be selected from the range of about 0.01 to about 3.0%, preferably about 0.1 to about 1.0% based on the rosin. If any one of these two components is used in an amount less than the above range, it is difficult to obtain a rosin ester having a fully satisfactory light color. Reversely the use of the two components in an amount exceeding the above range would be economically disadvantageous, far from imparting any particular advantage. Since the time for addition of the alkali metal iodide and anthraquinone may affect the color tone and heat stability of liquid rosin ester to be obtained, it is usually preferred to add the components prior to esterification or at the initial stage of the reaction.

The contemplated liquid rosin ester can be easily obtained by the foregoing reaction. The liquid rosin ester thus obtained is outstanding in tackiness and has unexpected characteristics in terms of the color tone, heat stability and the like, as compared with conventional liquid rosin esters. While the cause therefor remains to be clarified, the following factors may be mentioned: the alkali metal iodide has an activity as a disproportionated catalyst; side reactions such as ring-opening reaction and demethylation are likely to occur, resulting in the tendency to reduce the softening point of the obtained rosin ester; and the anthraquinone has a decoloring effect.

The liquid rosin esters obtained by the process of the present invention can be widely used for applications heretofore known, and are particularly suitable for use as hot melt pressure-sensitive adhesives or liquid tackifiers serving as a constituent of hot melt pressure-sensitive adhesives because the esters have the above various characteristics, i.e. tackiness, light color and high heat stability. It is a matter of course that the additives commonly used such as an anti-oxidant, light stabilizer, oil and the like can be used in preparation of these compositions.

Most Preferred Embodiments of the Invention for Practicing the Invention

To describe the invention in more detail, examples are given below to which, of course, the invention is not limited.

EXAMPLE 1

A 4-necked flask equipped with a stirrer, a condenser tube, a separating funnel and a nitrogen inlet tube was charged with 600 g of tall oil rosin [acid value: 174.5 (according to ASTM D465-51, same hereinafter), softening point: 68.0° C. (according to a ring and ball method, same hereinafter) and color tone: 6G (Gardner color, same hereinafter)], 90 g of diethylene glycol, 0.9 g of sodium iodide, and 1.8 g of anthraquinone. The mixture was heated to 230° C. in a nitrogen atmosphere to undergo reaction at the same temperature for 5 hours and then further heated to 270° C. for 5 hours of reaction at the same temperature.

Table 1 below shows the yield and constants of the liquid rosin ester thus obtained.

EXAMPLE 2

The same reaction as in Example 1 was repeated with the exception of using a triethylene glycol in place of the diethylene glycol used in Example 1, producing a liquid rosin ester.

Table 1 below shows the yield and constants of the liquid rosin ester thus obtained.

EXAMPLE 3

The same reaction as in Example 1 was repeated with the exception of using a gum rosin [acid value: 169.5, softening point: 78.0° C. and color tone: 6G] in place of the tall oil rosin used in Example 1, producing a liquid rosin ester.

Table 1 below shows the yield and constants of the liquid rosin ester thus obtained.

EXAMPLE 4

The same reaction as in Example 1 was repeated with the exception of using 260 g of n-octyl alcohol in place of 90 g of diethylene glycol used in Example 1, producing a liquid rosin ester.

Table 1 below shows the yield and constants of the liquid rosin ester thus obtained.

COMPARISON EXAMPLE 1

The same reaction as in Example 1 was repeated with the exception of not using sodium iodide, producing a liquid rosin ester.

Table 1 below shows the yield and constants of the liquid rosin ester thus obtained.

COMPARISON EXAMPLE 2

The same reaction as in Example 1 was repeated with the exception of using 1.2 g of sodium iodide and not using anthraquinone, producing a liquid rosin ester.

Table 1 below shows the yield and constants of the liquid rosin ester thus obtained.

The liquid rosin esters obtained above in the Examples and Comparison Examples were checked for the acid value, viscosity (25° C., centipoise), color tone and heat stability. The test for heat stability was carried out by the following method.

Test for Heat Stability

A 5 g quantity of each liquid rosin ester specimen was placed into a test tube having a 14 mm inside diameter and a 15 cm length and the specimen was left to stand in a hot dryer at 200° C. Two and six hours later the color tone of the contents was measured by a Garnder colorimeter. The smaller the difference in change of color tone between at the initial stage and after heating, the higher the heat stability.

The results obtained are shown below in Table 1.

TABLE 1

| Specimen No. | Yield (%) | Acid value | Viscosity (25° C.) | Color tone (G) | Heat stability In 2 hr | Heat stability In 6 hr |
| --- | --- | --- | --- | --- | --- | --- |
| Example 1 | 94 | 27 | 560,000 | 1+ | 5 | 7 |
| Example 2 | 93 | 37 | 420,000 | 1+ | 5 | 7 |
| Example 3 | 94 | 28 | 650,000 | 2 | 5+ | 7+ |
| Example 4 | 89 | 15 | 30,000 | 2 | 5+ | 7 |
| Comp. Ex. 1 | 93 | 20 | 1,000,000 | 5 | 9+ | 14 |
| Comp. Ex. 2 | 93 | 26 | 550,000 | 5 | 9 | 13 |

We claim:

1. A process for preparing a liquid rosin ester which is light-colored and highly stable, which comprises subjecting to thermal reaction a rosin and an alcohol in the presence of anthraquinone and at least one alkali metal iodide selected from sodium iodide or potassium iodide.

2. A process according to claim 1 wherein the alkali metal iodide is used in an amount of about 0.01 to about 3.0% by weight based on the rosin and the anthraquinone is used in an amount of about 0.01 to about 3.0% by weight based on the rosin.

* * * * *